United States Patent [19]

Jaszczak

[11] 4,057,726

[45] Nov. 8, 1977

[54] COLLIMATOR TRANS-AXIAL TOMOGRAPHIC SCINTILLATION CAMERA

[75] Inventor: Ronald J. Jaszczak, Arlington Heights, Ill.

[73] Assignee: G. D. Searle & Co., Skokie, Ill.

[21] Appl. No.: 643,256

[22] Filed: Dec. 22, 1975

[51] Int. Cl.² .......................... G01T 1/20; G01T 1/166
[52] U.S. Cl. .................................. 250/363 S; 250/505
[58] Field of Search ............................ 250/363 S, 505

[56] References Cited

U.S. PATENT DOCUMENTS

| 3,432,660 | 3/1969 | Anger | 250/363 S |
| 3,735,132 | 5/1973 | Colombo et al. | 250/363 S |
| 3,921,000 | 11/1975 | Muehllehner | 250/505 |

OTHER PUBLICATIONS

Section Imaging by Computer Calculation, by Muehllehner et al., from Journ. of Nuclear Medicine, Feb. 1971, vol. 12, No. 2, pp. 76-84.
Radionuclide Tomographic Image Reconstruction using Fourier Transform Techniques, by Kay et al., from Journ. of Nuclear Med., Nov. 1974, vol. 15, No. 11, pp. 981-986.

Primary Examiner—Archie R. Borchelt
Attorney, Agent, or Firm—Walter C. Ramm; Albert Tockman; Dennis O. Kraft

[57] ABSTRACT

A collimator is provided for a scintillation camera system in which a detector precesses in an orbit about a patient. The collimator is designed to have high resolution and lower sensitivity with respect to radiation traveling in paths laying wholly within planes perpendicular to the cranial-caudal axis of the patient. The collimator has high sensitivity and lower resolution to radiation traveling in otherplanes. Variances in resolution and sensitivity are achieved by altering the length, spacing or thickness of the septa of the collimator.

14 Claims, 6 Drawing Figures

COLLIMATOR TRANS-AXIAL TOMOGRAPHIC SCINTILLATION CAMERA

An improved collimator is provided for a scintillation camera system that employs a detector head for trans-axial tomographic scanning.

In a scintillation camera adapted for trans-axial tomographic scanning, a scintillation detector precesses in an orbit about a patient having an axis of precession corresponding to the cranial-caudal axis of the patient. The scintillation detector head employs an array of photodetectors viewing overlapping portions of a scintillation crystal which is formed in the shape of a disk. Radiation impinging upon the crystal, which is typically formed of thallium activated sodium iodide, causes flashes of light to be emitted which are detected by photomultiplier tubes viewing the area of emission. The photomultiplier tubes generate electrical signals proportional to the magnitude of the light intensity received. These signals are matrixed together to provide positional information thereby locating the point of origin of the scintillation in the plane of the crystal. If a collimator is interposed between the radiation source and the detector crystal, the location of the scintillation will correspond to the point of origin in the patient of the incident gamma ray causing the scintillation. This point is then depicted in a two-dimensional matrix. This brief description of the operation of a scintillation camera is adequate for purposes of this invention, as the basic principles are explained at length in U.S. Pat. No. 3,011,057.

In trans-axial tomographic scanning, a radiation detector is moved in an orbit about a subject of interest rotating to face the subject of interest at all times. Typically the subject of interest is a human patient and the orbit in which the radiation detector moves is a circular orbit in which the axis of the circle about which the detector precesses is an imaginary straight line passing through the cranial and caudal areas of the human patient, hereinafter referred to as the cranial-caudal axis. When the radiation detector is the detector of a scintillation camera and the orbit of movement is circular, the locus of movement of the center of the scintillation crystal is a circle having a radius equal to the distance of the scintillation crystal from the cranial-caudal axis. The scintillation detector is always tangent to this circle.

Use of a scintillation detector to produce images of radioisotope distribution at transverse planar sections along the cranial-caudal axis has been explained in detail in a number of publications, including U.S. Pat. No. 3,432,660. In that patent, the patient is rotated about the cranial-caudal axis while the scintillation camera detector remains stationary, but the relative movement between the detector and the patient is the same whether the detector precesses about the cranial-caudal axis while the patient remains stationary or whether the patient rotates about the same axis while the scintillation camera detector remains stationary. From the standpoint of patient comfort and immobility to the scintillation detector, it has been found desirable for the patient to remain stationary in a supine position.

In trans-axial tomographic scanning according to the present invention, a single precession of a scintillation camera detector about the patient produces an image showing the radioactive distribution in a plurality of section imaging planes, which are transverse planes that are mutually parallel and usually perpendicular to the cranial-caudal axis. Gamma rays eminating both from within and from without these planes are detected. Detected radiation producing scintillations in the crystal detector is associated by computational and storage means with the nearest section imaging plane. The motion of the scintillation camera detector about the cranial-caudal axis is digitized and represented in electronic form in a computation means, such as a small computer. Using an appropriate algorithm, the computer concurrently determines the distribution of radioactive events within a plurality of parallel section imaging planes, typically sections of planar configuration, but each having a thickness of about 2 centimeters. A suitable Fourier transform technique for obtaining an image in a single section imaging plane is described in an article by David B. Kay, John W. Keyes, Jr. and William Simon, "Radionuclide Tomographic Image Reconstruction Using Fourier Transform Techniques", *Journal of Nuclear Medicine*, Vol. 15, No. 11, pages 981–986, November, 1974. The computed radioactive distribution is displayed on a visual image display device. Precession continues for imaging in the section imaging plane until the scintillation detector has moved 360° about the cranial-caudal axis. In theory, a precession through only 180° would be practical, but precession through 360° is performed to minimize internal attenuation effects insofar as is possible. While precession of the detector is preferably a continuous advancement through the detector orbit, data registration within a particular imaging frame is performed in discrete counting intervals which are initiated and terminated in step-wise increments of from $\frac{1}{2}$° to 4°, preferably about 2°. Unlike prior devices which employ simple scintillation detectors as the detector element, the present device utilizes a scintillation camera detector so that a series of images of radioactive distribution within parallel section imaging planes are concurrently produced.

The principal problem in trans-axial tomographic radioisotope scanning is the length of time required to obtain meaningful data. A 40 minute scan is not an unusual requirement to obtain section images at six section imaging planes for a radioisotope brain scan using prior art devices. Patient movement during this scintillation scanning period introduces considerable distortion into the images obtained. Migration of the radioisotope through the system during the time that the scintillation detector traverses a single orbit results in a distortion of the data acquired for a section imaging plane. Likewise, radioisotope migration throughout the scanning interval renders difficult the comparison of radioisotope distribution images in the parallel section imaging planes. The reason for the extended period of time necessary to acquire the data in radioisotope imaging, as contrasted with tomographic x-ray scanning, is due to the much lower overall activity in the target area of interest, as much of the injected radioactivity localizes in areas of the body which are not the subject of the imaging study, for example in the colon. The gamma rays of a radioisotope dosage are therefore dissipated through the body of the patient and absorbed to some extent in the tissue of the patient, while in x-ray tomographic imaging a concentrated radiation dosage is administered only to the areas of interest.

It is an object of this invention to significantly reduce the time required to obtain statistically significant data in trans-axial tomographic radioisotope scanning using a scintillation camera.

It is a further object of the invention to provide a collimator for a scintillation camera for use in trans-axial tomographic radioisotope scanning to increase the rate of acceptance of radioactive events to contribute to the positional information obtainable from a radiation source of known strength without sacrificing spatial resolution.

It is a further object of the invention to provide an improved collimator for a scintillation camera for use in trans-axial tomographic radioisotope scanning which reduces the necessary scanning time without degrading the images obtained.

In a broad aspect the invention is a collimator for use in a scintillation camera system in which a scintillation camera detector moves in an orbit defining a transverse plane perpendicular to a cranial-caudal axis relative to a patient, in which septa define apertures therein such that the collimator means provides high spatial resolution of gamma rays traveling within planes perpendicular to the cranial-caudal axis and directed at the detector and high radiation sensitivity to gamma radiation traveling within other planes and indicated at the detector.

The invention may be more readily explained by reference to the accompanying drawing figures in which.

Figure 1:
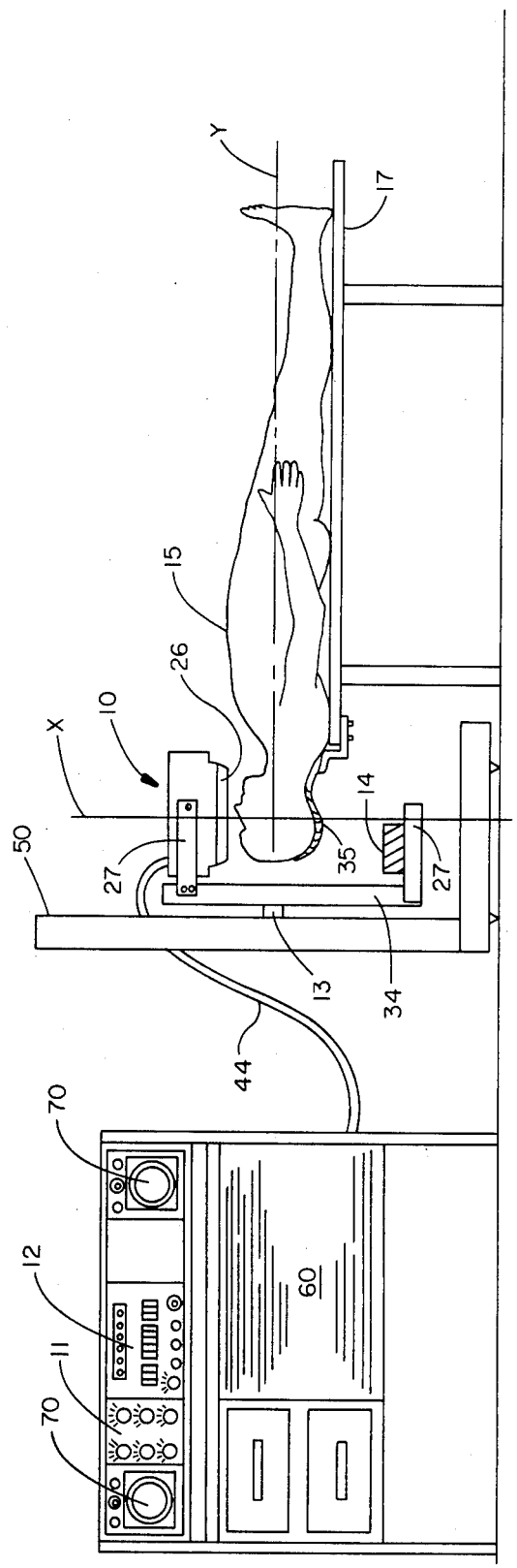
FIG. 1 is an elevational view of a scintillation camera positioned for trans-axial tomographic radioisotope scanning of a patient.

Referring now to FIG. 1, there is illustrated a scintillation camera system in which a scintillation detector 10 employs a scintillation crystal which is viewed in overlapping fashion by a plurality of photomultiplier tubes. The scintillation detector 10 is modified from general purpose scintillation camera detector heads for low energy radiation detection by the removal of a portion of the lead shielding which allows the detector 10 to move in an orbit in a plane perpendicular to the plane of FIG. 1 and to freely clear the shoulder of the patient 15.

The scintillation detector 10 is connected to a console containing a computer section 60, two oscilloscope displays 70, signal processing circuitry 12, and a control panel 11. A motor 13 drives the scintillation detector 10 in an orbit about the patient 15, which orbit defines one section imaging plane X perpendicular to a cranial-caudal axis Y of the patient. The motor 13 is mounted on the detector stand 50 and drives the rotating mounting arm 34 from which cross-arms 27 extend. The scintillation detector 10 is mounted between one pair of cross-arms 27 while a counter-balance weight 14 is mounted from the other pair of cross-arms. The motor 13 includes an indexing element for continuously advancing the detector 10 through its orbit about the patient 15. The indexing element of the motor 13 initiates and terminates radiation counting intervals at each arc in a series of incremental arcs which the detector 10 traverses in advancing through a path of 360° in its orbit about the patient. That is, if trans-axial tomographic scanning is initiated with the scintillation detector 10 positioned in the location depicted in FIG. 1, the scan will terminate for several parallel section imaging planes when the detector head 10 and the counter weight 14 rotate about axis Y and return to their original positions. The patient assumes a supine stationary position on the table 17 which includes a head support extension 35 that facilitates immobilization of the patient's head. While the device of FIG. 1 is arranged to accommodate scanning of only the head of the patient 15, an alternative support to the table 17 could be provided to allow whole body scanning. For example, the table 17 could be mounted in cantilever fashion near the feet of the patient.

Figure 2:
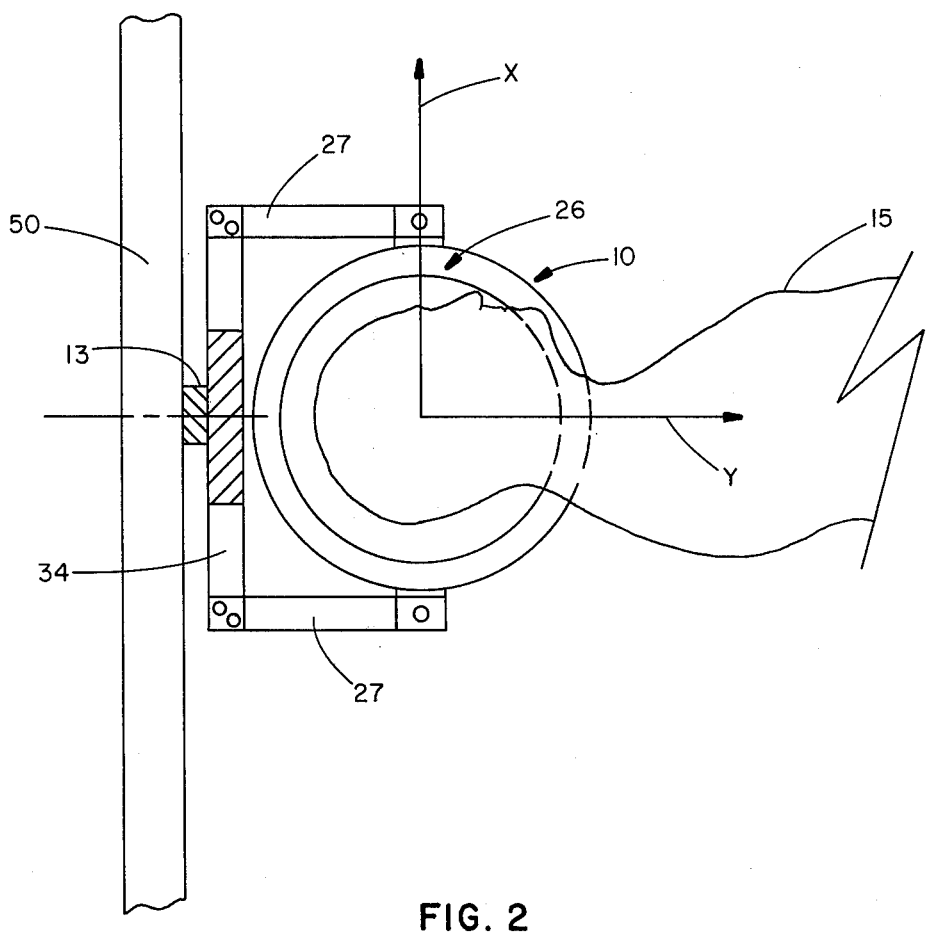
FIG. 2 is an enlarged view of the scintillation detector in one position in its orbit about the patient.
Figure 3:
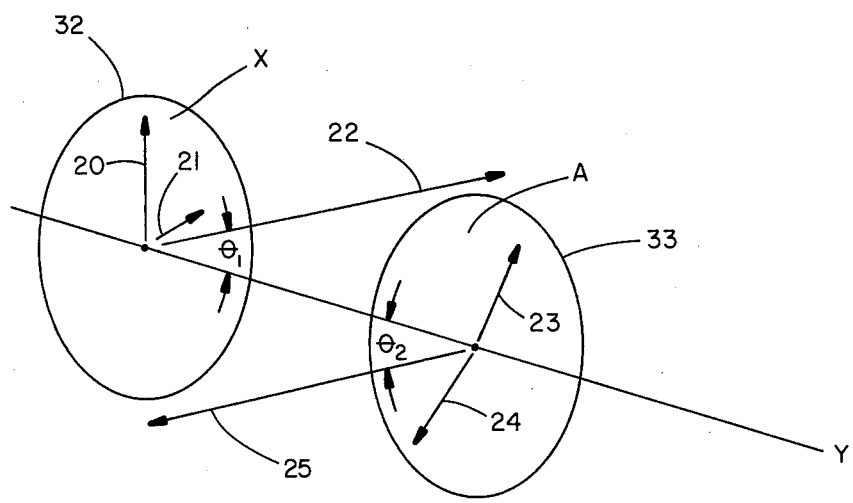
FIG. 3 is a diagramatic view illustrating the movement of the scintillation detector relative to the patient.

The signals from the scintillation detector 10 are fed to computation means 60 through the cable 44 so that the radiation counts detected at each of the incremental arcs may be processed to produce a representation of radioactive distribution in a series of section imaging planes defined by the algorithm and by the orbit, such as the planes X and A in FIGS. 1 and 2. Visual display means 70 for displaying an image of the representation are provided in the form of conventional oscilloscope displays. As in other scintillation camera studies, a camera film or other recording device can be mounted in optical communication with the visual displays 70. The locus of the movement of the center of the scintillation crystal of the detector 10 is illustrated in FIG. 3 for two section scanning planes, X and A. In the first section scanning plane X, the scintillation detector 10 moves in a circle 32 about the cranial-caudal axis, identified as the Y axis in the drawings. The circular orbits 32 and 33 define the section imaging planes X and A respectively. While the orbit of the scintillation detector is typically circular, it could be eliptical or form any other closed curve about the cranial-caudal axis Y. Of course, the algorithm employed would have to be adjusted to the orbit utilized.

Figure 4:
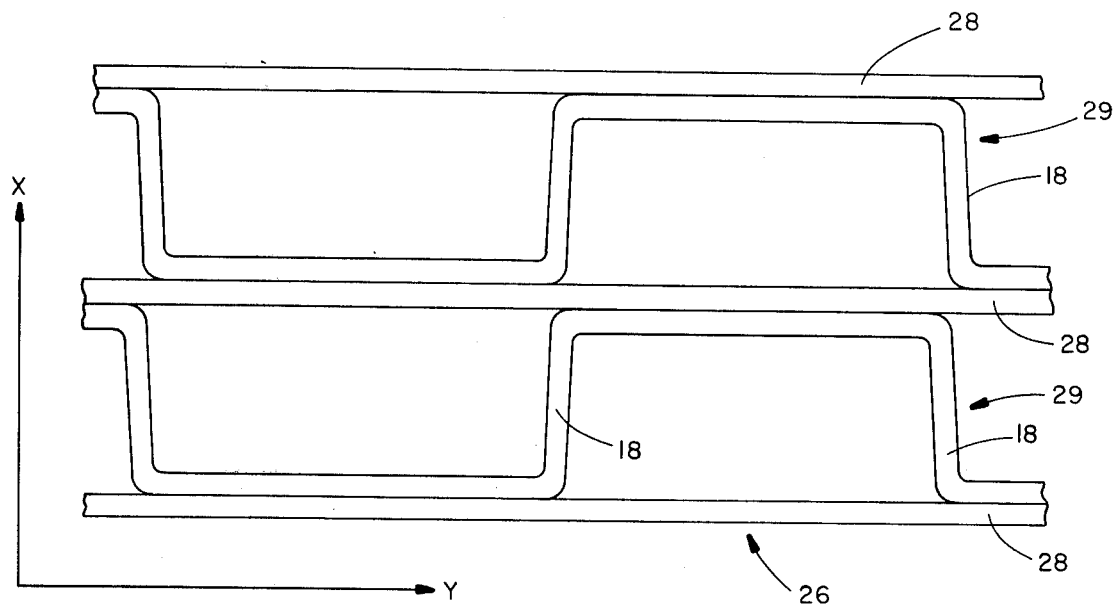
FIG. 4 is a detailed view of one embodiment of collimator construction.
Figure 5:
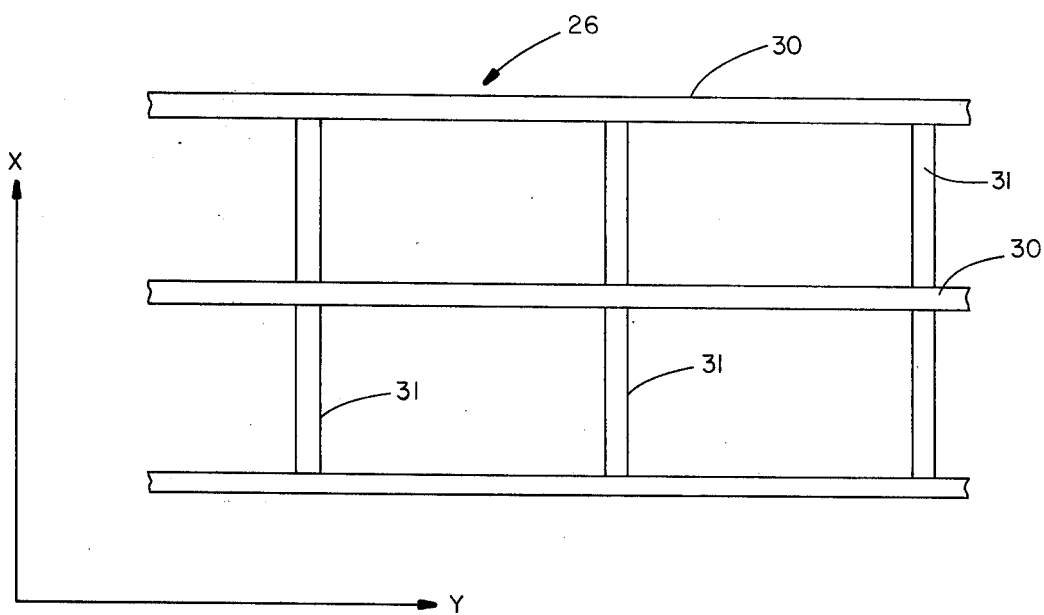
FIG. 5 is a detailed view of one alternative embodiment of collimator construction.
Figure 6:
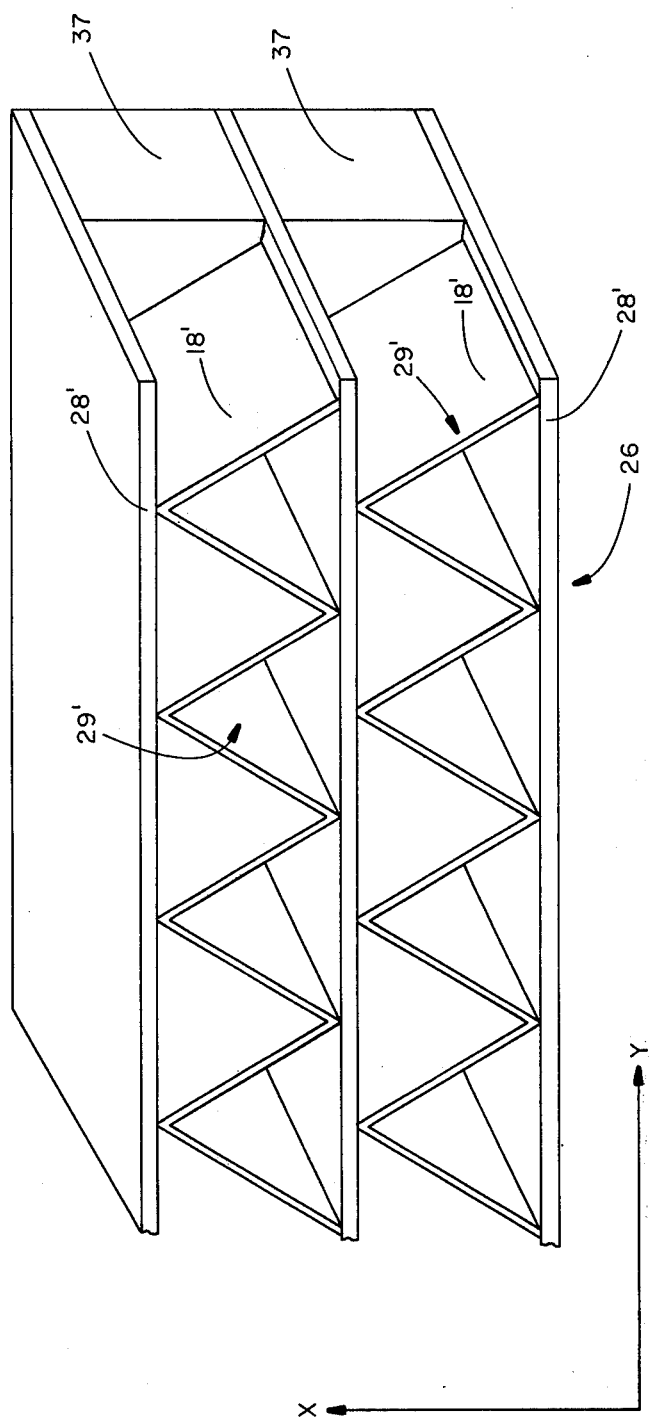
FIG. 6 is a detailed isometric view of another embodiment of collimator construction.

The construction of the collimator 26 is illustrated in alternative embodiments in FIGS. 4, 5 and 6. In FIG. 4, the construction of the collimator 26 is depicted with the orientation of the collimator in FIG. 4 being the same with respect to the X plane and Y axis as in FIG. 2. In the construction depicted in FIG. 4, the collimator is comprised of parallel strips 28 of lead about 0.01 inches (0.0254 centimeters) in thickness. Between these lead strips 28 are positioned corrugated strips 29 also fashioned of lead foil about 0.01 inches (0.0254 centimeters) in thickness. The strips 28 are aligned in parallel with the cranial-caudal axis Y. Construction of corrugated collimators is described in detail in U.S. Pat. No. 3,921,000. Of course the configuration of the collimator of FIG. 4 differs from the collimators described in the U.S. Pat. No. 3,921,000 in that the strips 29 in FIG. 4 are corrugated to form collimating apertures of generally rectangular configuration. These apertures are significantly longer in the Y-axis direction than in the X-axis direction. As a result of this collimator construction, gamma radiation traveling within a plane perpendicular to the cranial-caudal axis, such as the plane X, encounters greater shielding than does gamma radiation traveling in other planes.

By way of illustration, gamma rays 20 and 21 eminating from within and traveling wholly within the section scanning plane X are much more likely to be absorbed by the relatively closely spaced lead strips 28, which they are likely to intercept than is gamma ray 22 which proceeds at an angel $\theta_1$ with respect to cranial-caudal axis Y. Gamma ray 22 is much more likely to penetrate or pass between one or more of the more distantly spaced transverse portions 18 of the corrugated strips 29. The result is that the improved collimator of this invention renders the scintillation detector 10 more efficient in radiation detection in the Y axis direction, with a loss of resolution in the Y axis direction. At the same time, the construction of collimator 26 provides very high spatial resolution within the section scanning plane X.

This same improvement exists when the detector 10 moves with regard to other parallel section scanning planes, such as the section scanning A defined by the circle 33 of diameter equal to the diameter of circle 32. Gamma rays, indicated at 23 and 24 in FIG. 3, which travel in directions perpendicular to the Y axis encounter much greater detector shielding than does the gamma ray traveling in the path 25 at an angle $\theta_2$ with respect to the Y axis. The collimator 26 thereby provides high spatial resolution of gamma rays traveling within the planes X and A and high radiation sensitivity to gamma radiation traveling in other planes.

It can be noted, by reference to FIG. 3, that the path defined by the movement about axis Y of a single transverse collimator septum 18 which traverses the distance between two adjacent strips 28 would be a circle about axis Y for a 360° precession by detector 10.

One alternative embodiment of the collimator of this invention is depicted in FIG. 5. In this embodiment the septa of the collimator are formed of strips 30 and 31 of an uniform thickness. The spacing between the strips 31 in the direction parallel to the Y axis is greater than the spacing between the septa 30 in the planes perpendicular to the Y axis, as defined by the circular rings 32 and 33. Again, as in FIG. 4., it can be seen that the collimator embodiment of FIG. 5 likewise defines apertures in collimator 26 such that the collimator 26 provides high spatial resolution of gamma rays traveling within planes perpendicular to the Y axis and directed at the detector 10, and high radiation sensitivity to gamma radiation traveling within other planes and directed at detector 10. One modification of the collimator construction of FIG. 5 would be a construction in which the lead strips 30 are thicker than the lead strips 31.

The circular ring 32 in FIG. 3 in addition to defining one section imaging plane, also represents the path traced by the movement of the center of the scintillation crystal of the detector 10 as it precesses in step-wise fashion about the cranial-caudal axis Y. The ring 33 likewise represents the orbit of movements of a point on the scintillation crystal face displaced from the center. The ring 33 defines a section imaging plane A parallel to the plane X. As previously indicated, the resolution between the section imaging planes X and A is approximately 2 centimeters. In the images displayed on the oscilloscopes 70, there is no differentiation as to the Y axis position of a radioactive event as long as it lies within the 2 centimeter thickness of the section imaging plane. Thus it can be observed that there is no degradation of the images formed by virtue of the improved sensitivity in the Y axis direction provided by the collimator of this invention. That is, the additional events detected to provide improved sensitivity will originate primarily from within the section scanning plane, although they will be detected by the detector 10 at a displacement therefrom in the Y axis direction.

One further collimator embodiment is illustrated in FIG. 6. In this embodiment corrugated strips 29' of lead 0.01 inches (0.0254 centimeters) in thickness are interposed between straight strips 28' of lead foil, also 0.01 inches (0.0254 centimeters) in thickness. This aspect of corrugated collimator construction is similar to that depicted in the aforesaid U.S. Pat. No. 3,921,000. However, as is apparent from the drawing, the corrugated strips 29' do not extend as far in depth as do the straight strips 28'. At the ends of the strips 29' are positioned pieces of spacer material, such as balsa wood blocks 37. The balsa wood blocks 37 do not absorb gamma radiation, but they do hold the strips 28' in proper parallel alignment. The transverse elements 18' of the corrugated strips 29' butt up against the balsa wood blocks 37. The end of the collimator 26 in the front plane of FIG. 6 is positioned adjacent to the scintillation detector 10.

The foregoing illustrations and embodiments of the collimator of this invention have been depicted for purposes of explanation only. No unnecessary limitations should be construed therefrom, as other embodiments and modifications will become readily apparent in view of the disclosures herein.

I claim:

1. In a scintillation camera system in which a scintillation camera detector is arranged to precess in an orbit about a patient and facing said patient which orbit defines a transverse plane perpendicular to a cranial-caudal axis of said patient, and including indexing means for continuously advancing said detector in said orbit and for initiating and terminating radiation counting intervals at incremental arcs in said orbit, and computation means for processing the radiation counts detected and accumulated through each of said arcs to produce a representation of radioactive distribution in the plane defined by said orbit, and visual display means for displaying an image of said representation, the improvement comprising a collimator attached to said detector and interposed between said detector and said patient and having first shielding means defining highly radiation absorbent septa positioned to lie in straight lines generally parallel to said cranial-caudal axis as said detector precesses in said orbit, and a second shielding means defining less radiation absorbent septa in configurations the loci of which form closed curves parallel to the aforesaid orbit.

2. The scintillation camera system of claim 1 in which said scintillation camera detector is arranged to precess in a circular orbit about said patient.

3. In a scintillation camera system in which a scintillation camera detector moves in an orbit defining a plane perpendicular to a cranial caudal axis of a patient, the improvement comprising a collimator which includes septa means for increasing the radiation shielding against gamma radiation traveling within planes perpendicular to said cranial caudal axis relative to the radiation shielding against gamma radiation traveling within other planes.

4. The collimator of claim 3, in which said septa means defines apertures which are elongated in the direction of the cranial caudal axis.

5. The collimator of claim 4, wherein said apertures are rectangular in configuration.

6. The collimator of claim 3, in which said septa means defines apertures which are symmetric with respect to both a first direction parallel to the cranial caudal axis, and a second direction orthogonal to the cranial caudal axis and along the plane of the collimator.

7. The collimator of claim 3, in which said septa means defines apertures which are spaced more closely along a direction parallel to the cranial caudal axis than in the orthogonal direction.

8. The collimator of claim 3, in which said septa means are of a depth greater in the direction of said cranial-caudal axis than in the direction along the plane of the collimator and orthogonal to said cranial caudal axis.

9. The collimator of claim 8, in which said septa means comprises parallel strips of metal aligned in parallel with said cranial caudal axis, and between which are positioned corrugated strips of metal foil, said parallel strips being of greater depth than said corrugated strips.

10. A collimator for use in a scintillation camera system in which a scintillation camera detector moves in an orbit defining a transverse plane perpendicular to a cranial axis of a patient, said collimator including septa defining apertures spaced to intercept proportionately more of first gamma rays traveling within planes perpendicular to said cranial caudal axis as compared to second gamma rays traveling within other planes and directed at said detector, thereby providing high spatial resolution for said first rays and high radiation sensitivity for said second rays.

11. The collimator of claim 4 wherein spacing between septa measured in a direction parallel to said cranial caudal axis is greater than spacing between septa measured in planes perpendicular to said cranial caudal axis.

12. The collimator of claim 11 wherein said septa are formed of strips of lead of a uniform thickness.

13. The collimator of claim 11 wherein said septa are formed of strips of lead which are thicker in the cranial caudal direction than in the orthogonal direction within the plane of the collimator.

14. The collimator of claim 10 wherein septa are of greater depth in the direction parallel to the cranial caudal axis than in other directions.

* * * * *